United States Patent
Jones et al.

(10) Patent No.: US 11,618,972 B2
(45) Date of Patent: Apr. 4, 2023

(54) METHOD OF AND APPARATUS FOR INJECTING A LIQUID FORMULATION INTO A MOLTEN POLYMER

(71) Applicant: COLORMATRIX HOLDINGS, INC., Wilmington, DE (US)

(72) Inventors: Brian Jones, Merseyside (GB); David Whitehead, Cheshire (GB); Ian Campbell, Merseyside (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 426 days.

(21) Appl. No.: 16/488,824

(22) PCT Filed: Feb. 23, 2018

(86) PCT No.: PCT/IB2018/051146
§ 371 (c)(1),
(2) Date: Aug. 26, 2019

(87) PCT Pub. No.: WO2018/154506
PCT Pub. Date: Aug. 30, 2018

(65) Prior Publication Data
US 2020/0032421 A1   Jan. 30, 2020

(30) Foreign Application Priority Data

Feb. 27, 2017 (GB) .................................... 1703142

(51) Int. Cl.
*D01D 1/06* (2006.01)
*D01D 5/08* (2006.01)
(52) U.S. Cl.
CPC ............. *D01D 1/065* (2013.01); *D01D 5/08* (2013.01)

(58) Field of Classification Search
CPC ............ B29C 45/1606; B29C 45/1607; B29C 48/297; D01D 1/065; D01D 5/08
See application file for complete search history.

(56) References Cited

U.S. PATENT DOCUMENTS 2,837,102 A * 6/1958 Bauer ................. B01F 15/0412
                                                137/7
3,589,163 A * 6/1971 Byrne ..................... B21C 33/02
                                                72/270

(Continued)

FOREIGN PATENT DOCUMENTS

DE       10223374 A1   12/2003
DE    102012001108 A1    7/2013

(Continued)

OTHER PUBLICATIONS

International Search Report for PCT/IB2018/051146, dated May 3, 2018, 5 pages.

*Primary Examiner* — Emmanuel S Luk
(74) *Attorney, Agent, or Firm* — Fay Sharpe LLP

(57) ABSTRACT

Injector (14) for injecting a liquid formulation into a molten polymer includes outlet (21) at one end and, at its other end, is arranged to be connected to upstream conduit (25) via a coupling housing (26) so that liquid formulation can pass from conduit into the injector, and further includes an elongate conduit (27) in which an elongate pin is slideably arranged being capable of expelling all liquid formulation from conduit. To address the risk the outlet could become blocked in use, whilst avoiding the need to depressurize and/or stop the flow or polymer in extruder (19), the injection apparatus includes a spool (34) which is rotatably mounted within wall (35) of the extruder and is arranged to be rotated about an axis which extends substantially perpendicularly to the elongate extent of the extruder through which a polymer stream (18) flows. The spool may be (Continued)

moved between a first configuration and a second configuration wherein a flow path is interrupted, but wherein molten polymer continues to flow in said polymer flow conduit.

18 Claims, 9 Drawing Sheets

(56) References Cited

U.S. PATENT DOCUMENTS

| | | | | |
|---|---|---|---|---|
| 3,599,290 | A * | 8/1971 | Garner | B29C 45/1606 |
| | | | | 264/255 |
| 3,733,156 | A * | 5/1973 | Garner | B29C 45/1606 |
| | | | | 425/132 |
| 3,809,519 | A * | 5/1974 | Garner | B29C 45/1606 |
| | | | | 425/564 |
| 3,814,388 | A * | 6/1974 | Jakob | B01F 15/0243 |
| | | | | 366/131 |
| 4,114,195 | A * | 9/1978 | Dirksing | A47L 15/4427 |
| | | | | 134/199 |
| 4,715,393 | A * | 12/1987 | Newton | A01M 7/0092 |
| | | | | 137/538 |
| 6,182,685 | B1 | 2/2001 | Goff et al. | |
| 6,196,822 | B1 * | 3/2001 | Blundy | B29C 45/1606 |
| | | | | 425/130 |
| 6,595,681 | B2 * | 7/2003 | Chavis | B01F 5/045 |
| | | | | 366/167.1 |
| 7,278,776 | B2 * | 10/2007 | Helbing | B29C 48/37 |
| | | | | 366/76.1 |
| 2002/0176317 | A1 * | 11/2002 | Bellasalma | F16K 3/262 |
| | | | | 366/182.4 |
| 2003/0210605 | A1 * | 11/2003 | Hauck | B29C 48/525 |
| | | | | 366/87 |
| 2012/0007265 | A1 * | 1/2012 | See | B29C 48/298 |
| | | | | 264/40.3 |
| 2012/0097278 | A1 * | 4/2012 | Schamann | B29C 48/467 |
| | | | | 137/625.48 |
| 2013/0315029 | A1 * | 11/2013 | Helbing | B29B 7/94 |
| | | | | 366/152.2 |
| 2016/0168759 | A1 * | 6/2016 | Grassi | D01D 5/08 |
| | | | | 428/221 |

FOREIGN PATENT DOCUMENTS

| | | |
|---|---|---|
| GB | 1311162 | 3/1973 |
| KR | 10-2014-000619 A | 1/2014 |
| WO | 2012004661 A2 | 1/2012 |
| WO | 2014179039 A1 | 11/2014 |
| WO | 2014179069 A1 | 11/2014 |
| WO | 2014207472 A2 | 12/2014 |
| WO | 2017042726 A1 | 3/2017 |

* cited by examiner

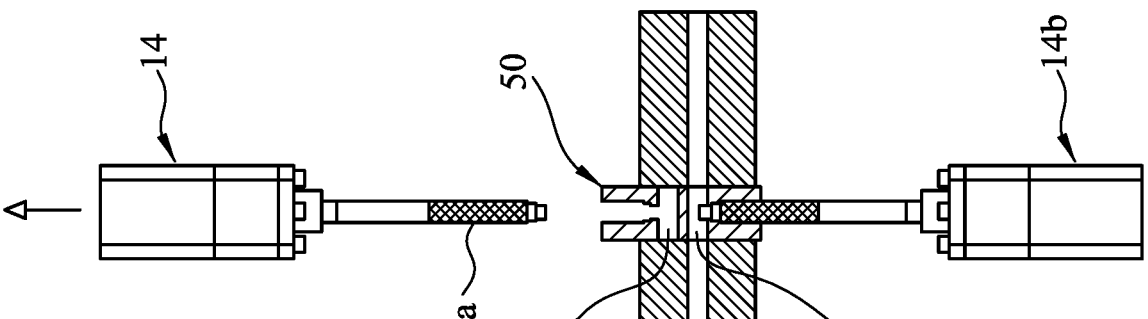
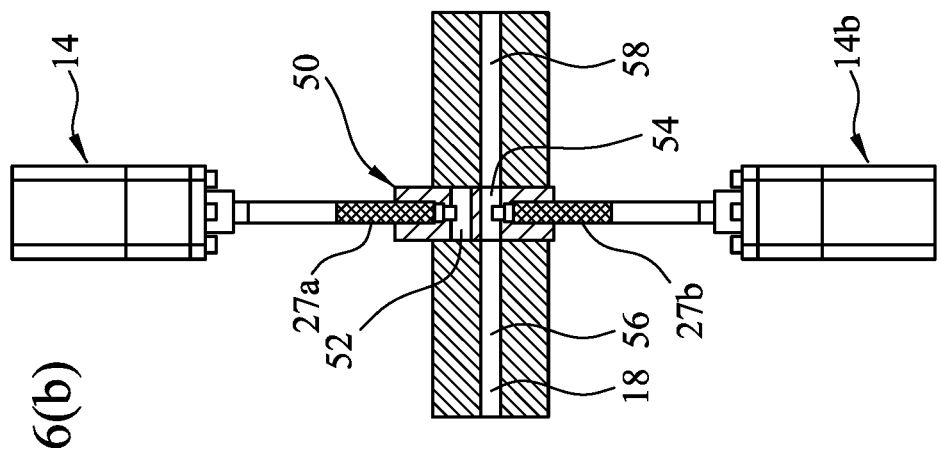
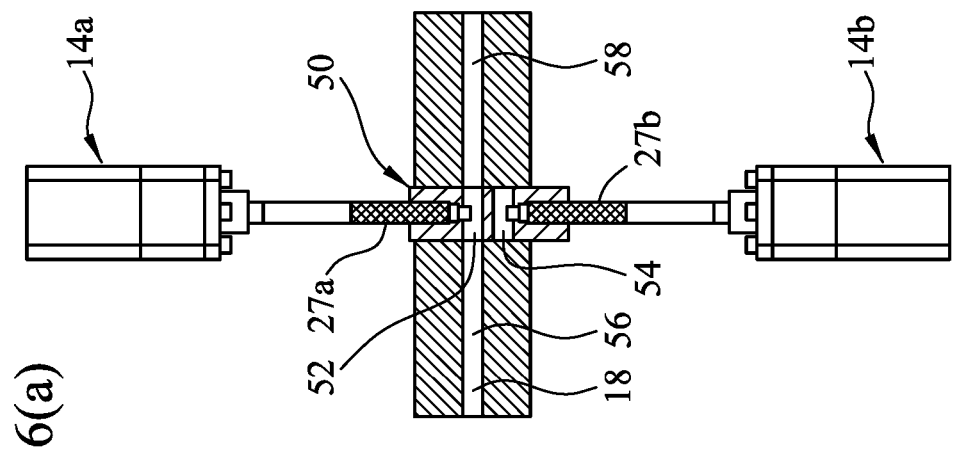
FIG. 6

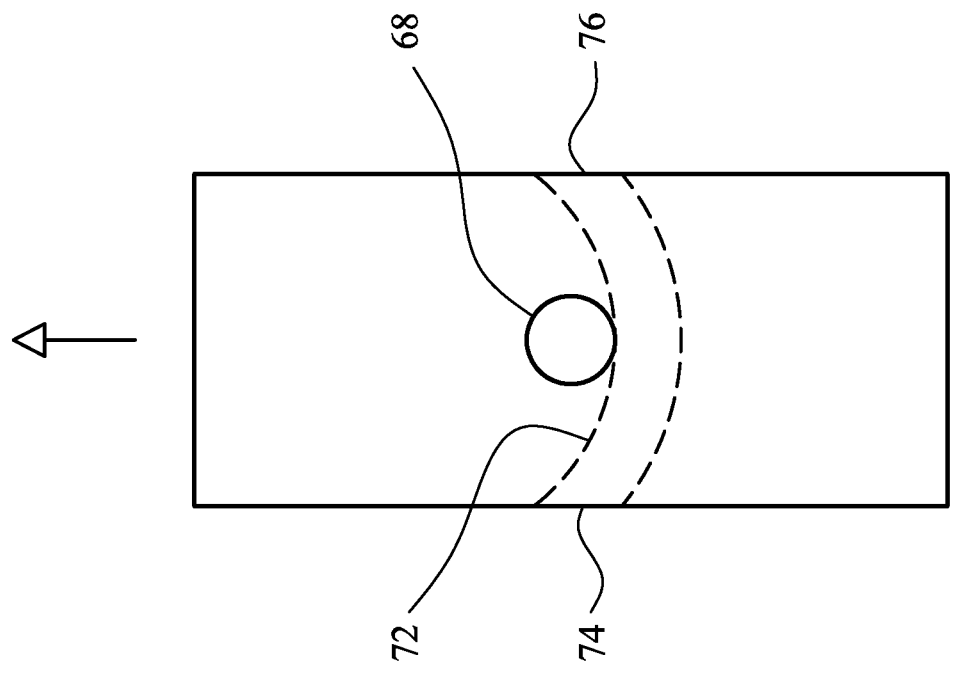
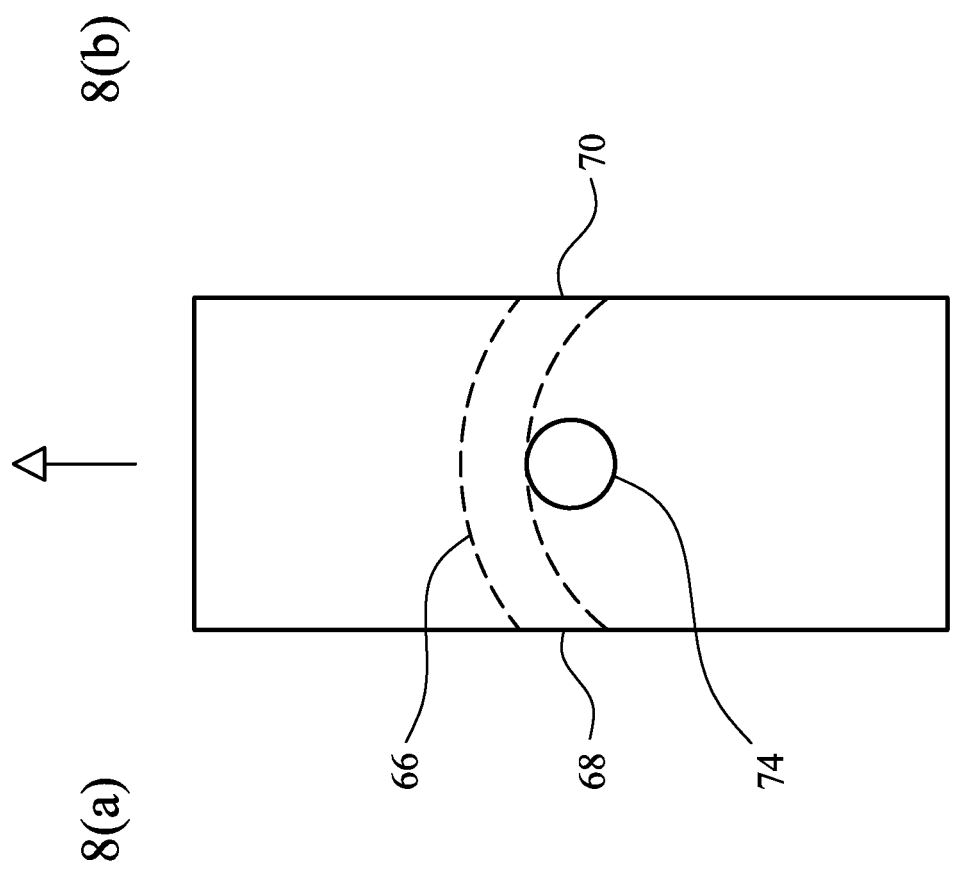
FIG. 8

FIG. 9
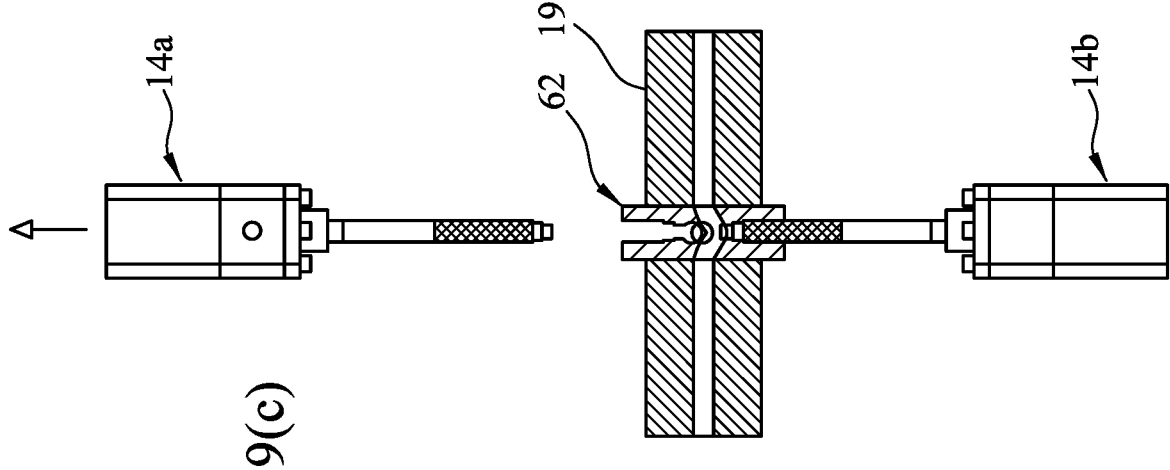
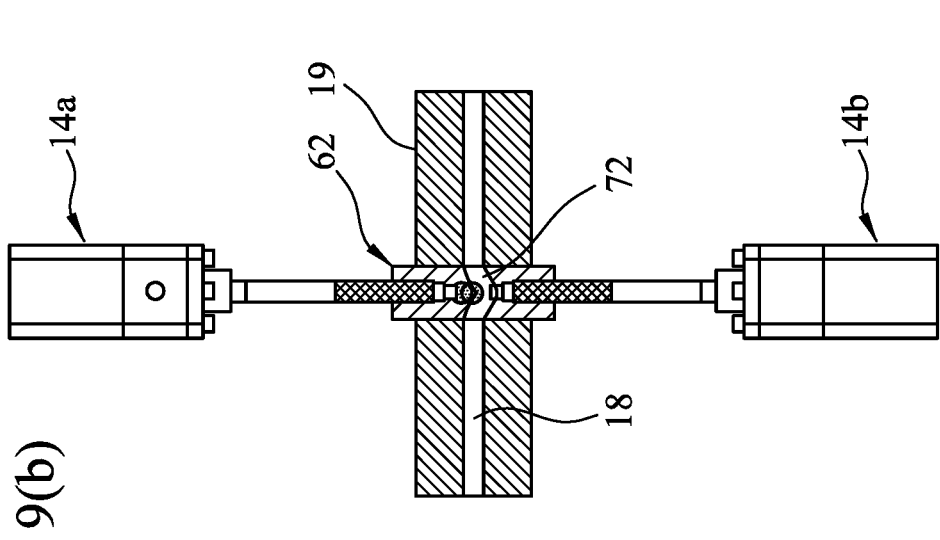
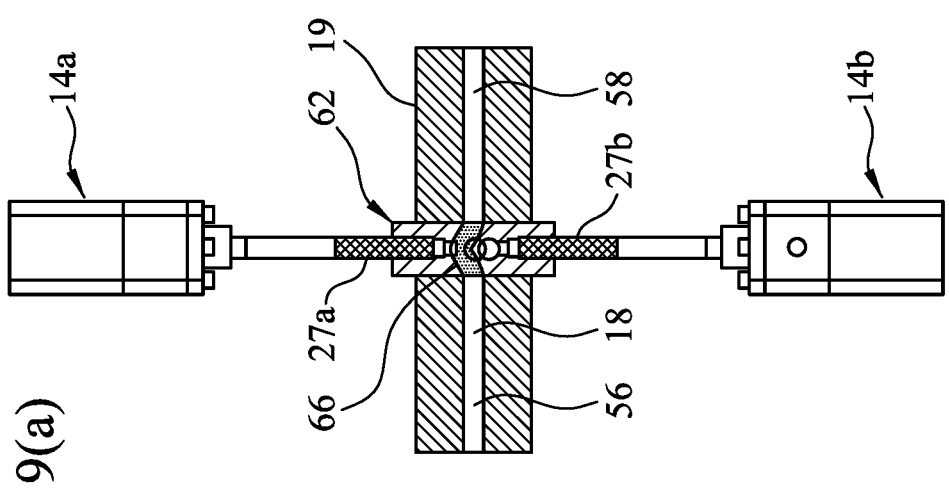

METHOD OF AND APPARATUS FOR INJECTING A LIQUID FORMULATION INTO A MOLTEN POLYMER

This invention relates to polymeric materials and particularly, although not exclusively, relates to a method of injecting a liquid formulation, for example including one or more colourants, into molten polymeric materials and apparatus therefor.

WO2014/207472 A2 describes high pressure injection apparatus for addition of a liquid formulation, for example comprising a vehicle and a colourant, into a melted polymeric material. The injection apparatus described includes a first pump which may be a diaphragm or progressing cavity pump (pcp) and a second pump which is a gear pump. The first and second pumps are arranged to raise the pressure of the liquid formulation and accurately meter it to an injector which is arranged to inject the formulation into the melted polymeric material in an extruder. Downstream of the contact between the formulation and polymeric material, the mixture may be used to form sheet or fibre or other articles in extrusion or blow moulding processes.

PCT/IB2016/055381 discloses injection apparatus for injecting a liquid formulation including a vehicle and colourant into a molten polymer at high pressure. The apparatus includes a reservoir containing liquid formulation at ambient temperature and pressure which is arranged to flood-feed a first progressing cavity pump (pcp) which is arranged to accurately meter the liquid formulation into a second pcp which is downstream of the first pcp and is arranged to increase the pressure of the liquid formulation by 200 bar or more. Downstream of the second pump is a delivery valve (e.g. an injector) arranged to control passage of liquid formulation, via an outlet, into a pressurised molten polymer stream which is present in an extruder.

An injector which is directly connected to an extruder to inject liquid formulation into molten polymeric material in the extruder includes a conduit for passage of liquid formulation from an inlet of the injector to an outlet from which the formulation is ejected from the injector and injected into the polymer material. Heat is conducted from the extruder and/or molten polymeric material contained therein to the outlet of the injector and, in turn, heat is conducted along the conduit of the injector towards its inlet so a temperature gradient exists across the conduit between its inlet and outlet. As a result, a liquid formulation to be injected by the injector is subjected to a temperature gradient as it passes through the conduit. This can lead to problems described below.

Liquid formulations may comprise a vehicle which is a liquid at STP and one or more colourants comprising pigments or dyes. Disadvantageously, some dyes may sublime during passage through the conduit and/or in the event that the liquid formulation is held in the conduit of the injector for an extended time, prior to initiation of injection into the polymeric material. As dyes sublime, the liquid formulation may thicken, increasing the likelihood the formulation may cause a blockage at the outlet of the conduit. In addition, some pigments used in liquid formulations may melt as the temperature to which they are subjected increases as the formulation moves towards the outlet of the conduit and other pigment may remain solid during such passage. Melting of pigments will affect the characteristics of the liquid formulation and this can lead to a blockage at the outlet of the conduit during passage of the liquid formulation through the conduit and/or in case of holding of the liquid formulation in the conduit.

Thus, it will be appreciated that, with the apparatus described, there is a risk at various times for the injector to become blocked and any such blockage must be addressed.

The most common way a blocked injector is addressed is for it to be disconnected from the extruder and cleaned. However, prior to disconnection, the pressure of the polymer flowing through the extruder must be reduced and processes downstream of the extruder (e.g. associated with spinning or sheet formation) must be stopped. Then, after cleaning, the injector can be re-connected, polymer pressure in the extruder increased and processes downstream of the extruder re-started. The down-time during cleaning may be 1-2 hours, meaning a significant amount of production of, for example fibre or sheet, can be lost. Given that in, for example spinning, one extruder may feed six to twelve spinning heads, the lost production could be significant.

U.S. Pat. No. 6,182,685B (Wellman) discloses an injector structure for a liquid additive which addresses the problem of cleaning the injector structure without removal of it from a production line by providing a valve body with an internal channel through which the liquid additive flows. A reciprocating stem is provided in the internal channel and is arranged to be reciprocated therein to loosen any matter which may obstruct the channel to facilitate flow of liquid therein. The apparatus described also includes an insulating jacket for minimising the effect that heat from an extruder, to which the injector structure is connected, may have on the liquid colourant as the liquid colourant flows through the injector.

It is an object of preferred embodiments of the present invention to address the above described problems.

According to a first aspect of the invention, there is provided a method of injecting a liquid formulation into molten polymer, said method comprising:

(i) selecting an apparatus comprising a polymer flow conduit for passage of molten polymer and an injector (I) arranged to deliver liquid formulation via a first flow path into polymer in said polymer flow conduit when the apparatus is in a first configuration;

(ii) with the apparatus in said first configuration, operating said injector (I) to inject liquid formulation into molten polymer in said polymer flow conduit, via said first flow path;

(iii) arranging the apparatus in a second configuration wherein said first flow path is interrupted and wherein molten polymer continues to flow in said polymer flow conduit;

(iv) with said apparatus in said second configuration, disengaging said injector (I) from other parts of the apparatus.

In step (iii), said first flow path is preferably closed and/or blocked off, suitably so that no liquid formulation is injected into said molten polymer in said polymer flow conduit. In said second configuration, said first flow path is suitably substantially completely obturated to prevent liquid formulation being injected into molten polymer in said polymer flow conduit.

In step (iii), preferably said first flow path is movable relative to said polymer flow conduit in order to define said second configuration.

In step (iii), preferably said injector (I) (and preferably said first flow path associated therewith) is movable relative to said polymer flow conduit in order to define said second configuration.

In step (iii), preferably said first flow path and/or said injector (I) is/are movable to a position which defines said second configuration, wherein a fluid passage between said first flow path and said polymer flow conduit is blocked off, so liquid formulation cannot flow from said first flow path into said polymer flow conduit.

In one embodiment, said first flow path and/or said injector (I) is/are rotated or pivoted to a position which defines said second configuration. Examples of rotation are described with reference to FIGS. 3, 7 and 9 hereinafter.

In another embodiment, said first flow path and/or said injector (I) undergo translational, for example, rectilinear, movement on movement to said second configuration. Examples of translational movement are described with reference to FIGS. 4 to 6 hereinafter.

Said first flow path preferably comprises a conduit (e.g. a pipe) which is suitably a component of said injector (I). Said conduit may be substantially rigid and suitably arranged to provide a substantially rigid connection between a body of said injector (I) and a wall which defines said polymer flow path. Said conduit is preferably arranged to be releasably secured (e.g. by being screw threaded) in position adjacent said polymer flow path.

Said injector (I), for example said conduit, is preferably secured to a movable body when said apparatus is in said first configuration. The movable body is preferably secured relative to a wall which defines said polymer flow path. In step (iii) of the method, said movable body may be moved.

When the apparatus is in said second configuration, the position of the movable body is suitably such that said first flow path is interrupted. In step (iii) of the method, said movable body may be rotated, pivoted or translationally and/or rectilinearly moved.

In step (iv), said injector (I) is preferably moved away from a position in which it can deliver liquid formulation via said flow path into polymer in said polymer flow conduit. In step (iv), said injector (I) is moved away from said polymer flow conduit, preferably so there is no physical and/or operative connection between said injector (I) and said polymer flow conduit. During such movement, preferably, molten polymer continues to flow in said polymer flow conduit.

The method preferably includes a step (v) which follows step (iv) which comprises cleaning injector (I) after disengagement, for example to remove a blockage therefrom.

The method preferably includes a step (vi) which follows step (iv) and comprises engaging an injector (herein "the newly-engaged injector") with other parts of the apparatus, when said apparatus is in said second configuration. The newly-engaged injector may be injector (I), after cleaning, for example in step (v) described or may be an injector other than injector (I).

The method may include a step (vii), after step (vi), which comprises, with said apparatus arranged in said second configuration, returning the apparatus to said first configuration, and using said newly-engaged injector to deliver liquid formulation into polymer in said polymer flow conduit.

Preferably, in the method, during the entire time from step (iii), through step (iv) wherein injector (I) is disengaged, during step (vi) wherein the newly-engaged injector is engaged with other parts of the apparatus and through step (vii) wherein the apparatus is returned to the first configuration, molten polymer flows continuously and/or uninterruptedly in said polymer flow conduit. Advantageously, this means that downstream processes, for example extrusion of polymer for sheet or fibre formation, can continue the entire time which minimises lost production.

In an embodiment (A), said polymer flow conduit of said apparatus includes a fixed conduit (I) for passage of liquid formulation and a movable section, wherein said movable section includes a first conduit for liquid formulation and a second conduit for liquid formulation, wherein said method comprises moving said movable section relative to the fixed conduit (I) on moving said apparatus from said first configuration to said second configuration. Preferably on moving said apparatus from said first to said second configuration as aforesaid, polymer can flow in said polymer flow conduit at all times. Preferably, at no stage during movement from said first to said second configuration is the polymer flow conduit fully closed off. Preferably, during the entirety of the movement from said first to said second configuration, at least one of said first conduit or said second conduit is positioned to allow passage of polymer along said polymer flow conduit. Preferably, at some stage during movement between said first and second configurations, part of said first conduit and part of said second conduit are arranged at the same time to allow passage of polymer along said polymer flow conduit; that is, preferably, at some stage during movement between said first and second configurations a part of said first conduit and a part of said second conduit are concurrently aligned with said fixed conduit (I). Preferably, when said apparatus is in said first configuration, said polymer flow conduit comprises said fixed conduit (I) and said first conduit (which are suitably aligned) and said method suitably comprises causing polymer to flow in said fixed conduit (I) and said first conduit. Preferably, when said apparatus is in said second configuration, said polymer flow conduit comprises said fixed conduit (I) and said second conduit (which are suitably brought into alignment on moving the apparatus to second configuration in step (iii)) and said method suitably comprises causing polymer to flow in said fixed conduit (I) and said second conduit.

Said polymer flow conduit may comprise said fixed conduit (I), said movable section which includes said first conduit and said second conduit and a fixed conduit (II), wherein one of said fixed conduits (I) or (II) is upstream of the movable section and the other one of said fixed conduits (I) or (II) is downstream of said movable section. In the method, on moving from said first configuration to said second configuration, said movable section is moved between said first configuration wherein said polymer flow conduit comprises said fixed conduit (I), said first conduit of said movable section and said fixed conduit (I) to said second configuration wherein said polymer flow conduit comprises said fixed conduit (I), said second conduit of said movable section and said fixed conduit (II).

In embodiment (A), said movable section may be rotated or pivoted or moved translationally (e.g. rectilinearly) relative to said fixed conduit (I). An example of said movable section being rotated is provided in FIGS. 7 and 8 hereinafter. In this case, said movable section is suitably arranged to be rotated about a fixed axis which may extend transversely, for example substantially perpendicularly, to the direction of flow of polymer through said fixed conduit (I). The movable section may be cylindrical. Said movable section may include two curved flow channels (hereinafter referred to as channels (A) and (B)) which suitably define the aforementioned first conduit for liquid formulation and second conduit for liquid formulation. Said channel (A) suitably includes diametrically opposed openings which are arranged to be aligned with said fixed conduit (I) and fixed conduit (II), when provided. Said channel (B) also suitably includes diametrically opposed openings which are arranged to be aligned with said fixed conduit (I) and fixed conduit (II), when provided. Openings in channel (A) preferably face in directions which are offset relative to the openings in channel (B). Said channel (B) preferably curves around channel (A). The movable section is preferably rotatable between a position wherein channel (A) is aligned with fixed conduit (A) and channel (B) is aligned with fixed conduit (A). Channels (A) and (B) may be associated with injector (I) and injector (II) respectively as described in embodiment (B) below.

In another form of embodiment (A), wherein said movable section is moved translationally relative to fixed conduit (I), said movable section may be slid (e.g. linearly) in a direction which may extend transversely, for example substantially perpendicularly to the direction of flow of polymer through said fixed conduit. Such an arrangement is illustrated in FIGS. 4, 5 and 6. The movable section may include two linear flow channels (herein referred to a channel (C) and channel (D)) which suitably define the aforementioned first conduit for liquid formulation and second conduit for liquid formulation. Said channel (C) suitably includes diametrically opposed openings which are arranged to be aligned with said fixed conduit (I) and fixed conduit (II), when provided. Said channel (D) also suitably includes diametrically opposed openings which are arranged to be aligned with said fixed conduit (I) and fixed conduit (II), when provided.

Said channels (C) and (D) are suitably arranged to be selectively moved (e.g. slid) into and out of alignment with said fixed conduit (I).

In an embodiment (B), said apparatus includes said injector (I) and an injector (II). The method preferably comprises, in step (iii), arranging said apparatus in said second configuration wherein said first flow path is interrupted and wherein molten polymer continues to flow in said polymer flow conduit and positioning said injector (II) adjacent said polymer flow conduit so it can deliver liquid formulation into polymer in said polymer flow conduit. The method preferably comprises operating said injector (II) to inject liquid formulation into molten polymer in said polymer flow conduit. When said injector (II) is operated to inject liquid formulation as aforesaid, injector (I) suitably does not inject liquid formulation into molten polymer.

Embodiments (A) and (B) may be combined. In this case, said injector (I) may be associated with said first conduit of said movable section and said injector (II) may be associated with said second conduit of said movable section, and the method comprises, in step (ii), operating said injector (I) to inject liquid formulation into said first conduit of said movable section; and, during or subsequent to step (iii), operating said injector (II) to inject liquid formulation into said second conduit of said movable section.

Said polymer flow conduit is preferably part of an extruder arranged to extrude the molten polymer. Downstream of the polymer flow conduit, molten polymer may be injection moulded or extruded to form products, for example sheets or spun. Said molten polymer is preferably spun to produce fibres. A plurality, for example at least four, spinning devices are preferably fed from said polymer flow conduit and, therefore, a plurality, for example at least four lengths of fibre are produced in the method.

Said liquid formulation delivered in the method may have a viscosity of at least 5000 cP, suitably at least 10000 cP, preferably at least 15000 cP. The viscosity may be less than 250,000 cP.

Unless otherwise stated, viscosity described herein may be measured using a Brookfield Viscometer at 20 rpm and 23° C.

Said liquid formulation may include vehicle and one or more additives. An additive may be selected from colourants, UV filters, oxygen absorbers, antimicrobial agents, acetaldehyde scavengers, reheat additives, antioxidants, light stabilizers, optical brighteners, processing stabilizers and flame retardants. Said additive preferably includes one or more colourants comprising pigments or dyes. Said liquid formulation preferably includes a pigment Said liquid formulation may include at least 20 wt %, preferably at least 35 wt %, more preferably at least 50 wt % of additives. Said formulation may include less than 85 wt % of additives. Said fluid formulation may include at least 15 wt % of liquid.

Preferably, said liquid formulation includes at least 20 wt % of colourant which may comprise one or more colourants. The total amounts of colourants in said liquid formulation may be at least 30 wt %, at least 45 wt % or at least 55 wt %. Colourants may be pigments or dyes. Said liquid formulation may include colourants which are insoluble in the vehicle at STP.

Said liquid formulation may include 15 to 80 wt % of vehicle and 20 to 85 wt % of additives.

Said liquid formulation may include a vehicle which is suitably a liquid at STP. Said vehicle preferably has a boiling point (at a pressure of 760 mmHg) of greater than 300° C., preferably greater than 350° C., more preferably greater than 500° C. The boiling point may be less than 1150° C. or less than 1000° C. The melting point of the vehicle may be less than 0° C. or less than −10° C.

Injection in step (ii) may be carried out continuously for at least 2 minutes, for example at least 10 minutes or at least 30 minutes.

Preferably, liquid formulation is selected and injected at a rate which introduces less than 10 wt %, more preferably less than 7 wt %, or less than 4 wt % of vehicle into the molten polymeric material. At least 0.01 wt % or at least 0.10 wt % of vehicle may be introduced. That is, after contact between formulation and molten polymeric material, the amount of vehicle in the mixture is preferably less than 10 wt %, less than 7 wt % or less than 4 wt %. The amount may be at least 0.01 wt % or at least 0.10 wt %.

Preferably, said polymer comprises a synthetic thermoplastic polymer. Said polymer is preferably able to be formed into fibres. Said polymer may be a condensation polymer, for example a condensation polymer which may depolymerise in the presence of water and/or a carrier with appropriate functional groups (which could include but is not limited to hydroxyl and carboxylic acid species). Said polymer may be selected from polyesters, polyamides, polyalkylene polymers (e.g polypropylene and polyethylene), polycaprolactone, polycarbonates, acrylics and aramids. In one preferred embodiment, said polymer is a polyester.

Said polymer preferably comprises a polyester which may be selected from poly(ethylene terephthalate) (PET), poly (butylene terephthalate) (PBT), poly(trimethylene terephthalate) (PTT), poly(ethylene naphthalate) (PEN), poly(1,4-cyclo-hexylenedimenthylene) terephthalate (PCT), poly (ethylene-co-1,4-cyclohexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), poly(ethylene terephthalate-co-isophthalate (PETA), poly(lactic acid (PLA), poly(glycolic acid) (PGA) and their blends of copolymers. Said polymer preferably comprises, more preferably consists essentially of PET.

A typical spinnable condensation polymer such as polyester, for example PET, may have up to 250 or up to 200 repeat units (e.g. molecular weight of up to 25,000 or up to 20,000). The number of repeat units may be in the range 50-200, suitably 75-200, preferably 75-125 repeat units. A typical spinnable polymer may have about 100 repeat units. The condensation polymer may be linear and be able to reach the high levels of orientation and crystallinity which are induced during spinning and drawing processes.

Typical spinnable polyesters have an IV in the range 0.62 to 1 dl/g. Preferred polyesters have an IV within the range of 0.5 to 1.2 dl/g when measured using standard techniques (for example ASTM D4603-03).

Said method preferably comprises sensing whether said injector (I) is blocked or partially blocked. The method may comprise output of an alarm, for example to alert an operator when said injector (I) is blocked or partially blocked. Sensing whether said injector (I) is blocked or partially blocked may comprise monitoring pressure of said liquid formulation and/or monitoring for changes in pressure of said liquid formulation.

According to a second aspect of the invention, there is provided apparatus for use in the method of the first aspect, the apparatus comprising:

(i) a melt-processing device which includes a polymer flow conduit for passage of molten polymer;

(ii) an injector (I) arranged to deliver liquid formulation via a first flow path into polymer within the melt-processing device;

(iii) means for reconfiguring the apparatus between a first configuration in which said injector (I) is arranged to deliver liquid formulation via said first flow path into polymer within the polymer flow conduit and a second configuration in which said first flow path is restricted.

Said apparatus is preferably arranged so that, with the apparatus in said first configuration, said injector (I) can be operated to inject liquid formulation into molten polymer in said polymer flow conduit, via said first flow path. Said apparatus is preferably arranged so that, with the apparatus in said second configuration, said first flow path is interrupted but molten polymer can continue to flow in said polymer flow conduit. Said apparatus is preferably arranged so that said injector (I) can be disengaged from other parts of the apparatus.

Said apparatus is preferably arranged so that, when in said second configuration, said first flow path is arranged to be closed and/or blocked off, suitably so that no liquid formulation can be injected into molten polymer in said polymer flow conduit. Said apparatus is preferably arranged so that, when in said second configuration, said first flow path can be substantially completely obturated to prevent liquid formulation being injected into molten polymer in said polymer flow conduit.

Said apparatus is preferably arranged so that said first flow path is movable relative to said polymer flow conduit in order to define said second configuration.

In said apparatus, said injector (I) (and preferably said first flow path associated therewith) is suitably movable relative to said polymer flow conduit in order to define said second configuration.

Said apparatus is preferably arranged so that said first flow path and/or said injector (I) is/are movable to a position which defines said second configuration, wherein a fluid passage between said first flow path and said polymer flow conduit is blocked off, so liquid formulation cannot flow from said first flow path into said polymer flow conduit.

In said apparatus, in one embodiment, said first flow path and/or said injector (I) may be rotatable or pivotable to a position which defines said second configuration.

In said apparatus, in another embodiment, said first flow path and/or said injector (I) may be translationally, for example, rectilinearly, movable to define said second configuration.

Said first flow path preferably comprises a conduit (e.g. a pipe) which is suitably a component of said injector (I). Said conduit may be substantially rigid and suitably arranged to provide a substantially rigid connection between a body of said injector (I) and said polymer flow path. Said conduit is preferably arranged to be releasably secured (e.g. by being screw threaded) in position adjacent said polymer flow path.

Said injector (I), for example said conduit, is preferably secured to a movable body when said apparatus is in said first configuration. The movable body is preferably secured relative to a wall which defines said polymer flow path. Said movable body may be movable for moving the apparatus between said first and second configurations.

When the apparatus is in said second configuration, the apparatus is preferably arranged so the position of the movable body is such that said first flow path is interrupted. Said movable body may be arranged to be rotated, pivoted or translationally and/or rectilinearly moved.

Said injector (I) is preferably arranged to be moved away from a position in which it can deliver liquid formulation via said flow path into polymer in said polymer flow conduit. Said injector (I) is preferably arranged to be moved away from (and preferably returned to) said polymer flow conduit, preferably so there is no physical and/or operative connection between said injector (I) and said polymer flow conduit. The apparatus is preferably arranged such that, during such movement, molten polymer can continue to flow in said polymer flow conduit.

Said apparatus may include an injector (II) which may be arranged to replace injector (I).

Preferably, the apparatus is arranged such that during the entire time the apparatus is moved between said first and second configurations, molten polymer can flow continuously and/or uninterruptedly in said polymer flow conduit.

In an embodiment (A), said polymer flow conduit of said apparatus includes a fixed conduit (I) for passage of liquid formulation and a movable section, wherein said movable section includes a first conduit for liquid formulation and a second conduit for liquid formulation. The apparatus may be arranged for movement of said movable section relative to the fixed conduit (I) on moving said apparatus from said first configuration to said second configuration. Preferably, the apparatus is arranged such that, on moving said apparatus from said first to said second configuration as aforesaid, polymer can flow in said polymer flow conduit at all times. Preferably, the apparatus is arranged such that, at no stage during movement from said first to said second configuration is the polymer flow conduit fully closed off. Preferably, the apparatus is arranged such that, during the entirety of the movement from said first to said second configuration, at least one of said first conduit or said second conduit is positioned to allow passage of polymer along said polymer flow conduit. Preferably, the apparatus is arranged such that, at some stage during movement between said first and second configurations, part of said first conduit and part of said second conduit are arranged at the same time to allow passage of polymer along said polymer flow conduit. Preferably, the apparatus is arranged such that, when said apparatus is in said first configuration, said polymer flow conduit comprises said fixed conduit (I) and said first conduit (which are suitably aligned). Preferably, the apparatus is arranged such that, when said apparatus is in said second configuration, said polymer flow conduit comprises said fixed conduit (I) and said second conduit (which are suitably brought into alignment on moving the apparatus to second configuration in step (iii)).

Said polymer flow conduit may comprise said fixed conduit (I), said movable section which includes said first conduit and said second conduit and a fixed conduit (II), wherein one of said fixed conduits (I) or (II) is upstream of the movable section and the other one of said fixed conduits (I) or (II) is downstream of said movable section. Said apparatus is preferably arranged such that, on moving from said first configuration to said second configuration, said movable section is moved between said first configuration wherein said polymer flow conduit comprises said fixed conduit (I), said first conduit of said movable section and said fixed conduit (I) to said second configuration wherein said polymer flow conduit comprises said fixed conduit (I), said second conduit of said movable section and said fixed conduit (II).

In an embodiment (B), said apparatus may include said injector (I) and an injector (II). Said apparatus is preferably arranged such that, in said second configuration wherein said first flow path is interrupted and wherein molten polymer continues to flow in said polymer flow conduit, said injector (II) can be positioned adjacent said polymer flow conduit so it can deliver liquid formulation into polymer in said polymer flow conduit. Said injector (II) may be operable to inject liquid formulation into molten polymer in said polymer flow conduit. Said apparatus may be arranged such that, when said injector (II) is operated to inject liquid formulation as aforesaid, injector (I) suitably is not able to inject liquid formulation into molten polymer.

Embodiments (A) and (B) may be combined. In this case, in said apparatus, said injector (I) may be associated with said first conduit of said movable section and said injector (II) may be associated with said second conduit of said movable section.

Said polymer flow conduit is preferably part of an extruder arranged to extrude the molten polymer. Downstream of the polymer flow conduit, the apparatus may include means for injection moulding or extruding molten polymer to form products, for example sheets or fibre. Said apparatus may include a plurality, for example at least four, spinning devices arranged to be fed from said polymer flow conduit and, therefore, a plurality, for example at least four lengths of fibre can be produced.

Said apparatus may contain a liquid formulation as described according to the first aspect.

Said apparatus may include a polymer as described according to the first aspect.

Said apparatus may include a sensor for sensing whether said injector (I) is blocked or partially blocked. Said apparatus may include an alarm, for example to alert an operator when said injector (I) is blocked or partially blocked. Said apparatus may include one or more pressure monitoring devices for monitoring pressure of said liquid formulation and/or monitoring for changes in pressure of said liquid formulation.

Said apparatus may include a driver or actuator for reconfiguring the apparatus between a first configuration in which said injector (I) is arranged to deliver liquid formulation via said first flow path into polymer within the polymer flow conduit and a second configuration in which said first flow path is restricted.

Said apparatus preferably comprises a first pump upstream of said injector (I) and being arranged to pump liquid formulation to said injector (I). Said apparatus may include a second pump upstream of said injector (I) and, preferably, said first pump and said second pump are arranged in series in said fluid path and said first pump is upstream of said second pump.

A conduit (A) is preferably provided between said first pump and said second pump. Said conduit (A) may have an inside diameter of less than 25 mm; and said inside diameter may be at least 1 mm.

Said first pump is preferably arranged to feed (e.g. flood feed) liquid formulation into an inlet of the second pump (suitably via said conduit (A)) at a pressure which is greater than atmospheric pressure. The pressure is suitably greater than 100 KPa (1 bar), preferably greater than 200 KPa (2 bar), more preferably greater than 250 KPa (2.5 bar). The pressure is suitably less than 1000 KPa (10 bar), preferably less than 500 KPa (5 bar).

Said pump body of said second pump may include a pressure monitoring device (Q) (e.g. a pressure transducer) for monitoring the pressure of liquid formulation within the pump body. Said apparatus is suitably arranged such that pressure information from device (Q) is communicable to a processing unit.

Said second pump is suitably arranged to increase pressure by at least 10000 KPa (100 bar), more preferably by at least 15000 KPa (150 bar), especially by at least 19000 KPa (190 bar).

Said apparatus suitably includes a pressure monitoring device (R) (e.g. a pressure transducer) for monitoring the pressure of liquid formulation downstream of the second pump. The apparatus is suitably arranged such that pressure information from device (R) is communicable to a processing unit.

Said apparatus preferably (but not essentially) includes a pressure monitoring device (S) (e.g. a pressure transducer) for monitoring the pressure of liquid formulation upstream of said second pump, for example to monitor the pressure of the liquid formulation immediately prior to entry of the liquid formulation into the second pump. The apparatus is suitably arranged such that pressure information from device (S) is communicable to a or said processing unit.

Preferably, said first pump is provided upstream of the second pump and a reservoir is suitably upstream of the first pump, with the reservoir being suitably connected to the first pump via a conduit (B), which may have an inside diameter in the range 4 to 20 mm. The conduit (B) preferably provides an uninterrupted fluid connection between said reservoir and first pump. The conduit (A) described suitably extends between the first pump and second pump for passage of fluid formulation from the first pump to the second pump.

The reservoir is preferably arranged to deliver fluid formulation to the inlet of the first pump at a pressure of less than 1200 KPa (1.2 bar). Said reservoir is preferably open to atmospheric pressure. Said reservoir is preferably not separately pressurized. Suitably, the apparatus is arranged such that the pressure at the inlet of the first pump is defined by the static head of fluid in the reservoir and atmospheric pressure and no additional means is provided for pressurizing the reservoir. Preferably, the reservoir and first pump are arranged for flooded suction of the first pump, with fluid from the reservoir—i.e. fluid from the reservoir is effectively "poured" into the first pump.

The reservoir may have a volume in the range 1 to 50 litres, preferably 1 to 20 litres, more preferably 1 to 10 litres. In order to change the identity (e.g. colour) of a fluid formulation injected by the apparatus, the first pump and the reservoir (including fluid formulation contained therein) may be disengaged and removed from other parts of the apparatus. To enable this to be done by one person, the reservoir suitably has the preferred volume described.

Said apparatus preferably includes a storage container for fluid formulation, wherein said storage container is arranged to deliver fluid formulation into said reservoir. Said storage container may be supplied by a manufacturer of the liquid formulation. It may have a volume of at least 10 litres, preferably at least 20 litres. The volume may be less than 100 litres. The volume of the storage container is preferably the same as or, more preferably, greater than the volume of the reservoir.

The reservoir may contain a liquid formulation having any feature of the liquid formulation herein described.

The storage container may contain a liquid formulation having any feature of the liquid formulation hereinafter described.

The reservoir and storage container preferably contain the same liquid formulation.

The apparatus may be arranged to control said first pump, for example the speed thereof, in dependence upon the amount of liquid formulation which it is desired to inject into the melted polymeric material. Suitably, the function of the first pump is to meter the liquid formulation in accordance with the parameters set on a or said processing unit.

The apparatus may be arranged to control said second pump, for example the speed thereof automatically in dependence upon the pressure assessed, by for example said pressure monitoring device (S). Suitably the function of the second pump is to increase the pressure of the liquid formulation such that the liquid formulation can be injected into melted polymeric material, Suitably, the pressure at the inlet of the second pump as assessed by pressure monitoring device (S) is maintained at a consistent and pre-determined set-point, via a or said processing unit.

Said first pump and said second pump are preferably independently operable. Preferably, the speed of the first pump can be adjusted independently of the speed of the second pump; and preferably the speed of the second pump can be adjusted independently of the speed of the first pump.

Between said reservoir and said outlet of the apparatus via which liquid formulation may be delivered into a melted polymeric material, said apparatus preferably includes only two pumps—said first pump and said second pump.

A pressure monitoring device (T) is preferably provided for monitoring the pressure of the molten polymer in said polymer flow conduit, suitably adjacent the position of injection of liquid formulation into the molten polymer. Information relating to said pressure is suitably arranged to be communicated to a or said processing unit of the apparatus.

In one embodiment, the apparatus may be arranged to track the pressure of the molten polymer with which it is hydraulically linked. The injector (I) is suitably opened by a or said processing unit when the pressure as assessed by pressure monitoring device (R) reaches a pre-determined pressure-level. This may be at or slightly above the polymer pressure as assessed by the pressure monitoring device (T). Once the valve is open, the molten polymer and the injector (I) are hydraulically linked and the pressure monitored by devices (R) and (T) will remain closely linked. The or said processing unit will suitably modulate the speed of the second pump to maintain a consistent pressure assessment by the pressure monitoring device (S).

In another embodiment, the apparatus for injecting may be arranged to open the injector (I) controlling the liquid formulation at a pressure set directly on a or said processing unit. Once the injector (I) is open, the molten polymer and the injector (I) are hydraulically linked and the pressure monitored by devices (R) and (T) will remain closely linked. The or said processing unit may modulate the speed of the second pump to maintain a consistent pressure assessment by the device (S).

The apparatus for injecting, for example a or said processing unit thereof, may receive periodic feedback on the pressure of the molten polymer and the apparatus, for example a or said processing unit, is suitably programmed to monitor the pressure of injection by injector (I), compare with the assessed molten polymer pressure or programmed pressure range limits and feedback to the operator accordingly. Significant deviation between liquid formulation pressure and molten polymer pressure (monitored or programmed) may be used as indicators of incorrect functioning and trigger a system alarm or controlled injection system shutdown.

Said apparatus preferably includes a mixing means for facilitating mixing of the liquid formulation and molten polymer. The mixing means may be provided by using either static or dynamic mixers. Dynamic mixers are preferred in applications where liquid formulations are added to the melt phase of the polymer i.e. where small amounts of low viscosity fluid require mixing with large volumes of high viscosity fluid. Cavity transfer mixers are especially preferred due to the high distributive mixing forces that are applied down the length of the mixer enabling the required high shear process to be applied in a controllable manner. Downstream of the point of contact of liquid formulation and polymeric material, there may be a spinning means for spinning the polymeric material to define fibres.

A or said processing unit of said apparatus for injecting is suitably arranged to operate said first pump so that the pressure difference between the inlet and outlet of the first pump is less than 8 bar, for example less than 5 bar or less than 3 bar. In this case, the first pump may be arranged not to significantly increase the pressure of the liquid formulation in use. The primary function of the first pump may be to meter formulation. The second pump may be operated, suitably under control of said processing unit, to significantly increase pressure of the liquid formulation in use. Thus, the processing unit of said apparatus is suitably arranged to operate said second pump so that the pressure difference between its inlet and outlet is greater than 10000 KPa or greater than 15000 KPa. The processing unit may also control metering by the first pump by maintaining the pressure immediately downstream of the first pump substantially constant.

As described, the apparatus suitably includes a processing unit for controlling and/or monitoring the first pump and second pump. The processing unit is suitably arranged to receive information from pressure monitoring devices (S) and (R), suitably as described above, to monitor pressure at the inlet and outlet of the second pump. Said processing unit may be arranged to receive information from the melt processing device. For example, information on pressure of the molten polymer is suitably communicated to the processing unit. Information on the flow rate of the molten polymer may also be communicated to the processing unit. Information on the state of the injector (I) downstream of the second pump may be communicated to the processing unit.

The apparatus suitably includes a user interface by means of which a user may input process information. For example, one or more of the following may be input by a user: melt processing device throughput, injection point pressure and LDR (Let-Down-Ratio).

Said first pump is preferably a progressing cavity pump (pcp). Said second pump is preferably a pcp.

Said injector (I) (and suitably injector (II) when provided) preferably include(s) an elongate conduit and an elongate pin which is movable within the conduit to open or close the conduit to allow or prevent flow of liquid formulation from an outlet thereof. The pin is preferably arranged to extend to an outlet face of said outlet so that it is flush to or extends beyond (i.e. downstream of the outlet), so that liquid formulation can be fully expelled from the elongate conduit and/or none is retained in any dead-spot associated with the outlet.

Any feature of any invention or embodiment described herein may be combined with any other invention described herein mutatis mutandis.

Specific embodiments of the invention will now be described, by way of example, with reference to the accompanying drawings, in which.

Figure 3:
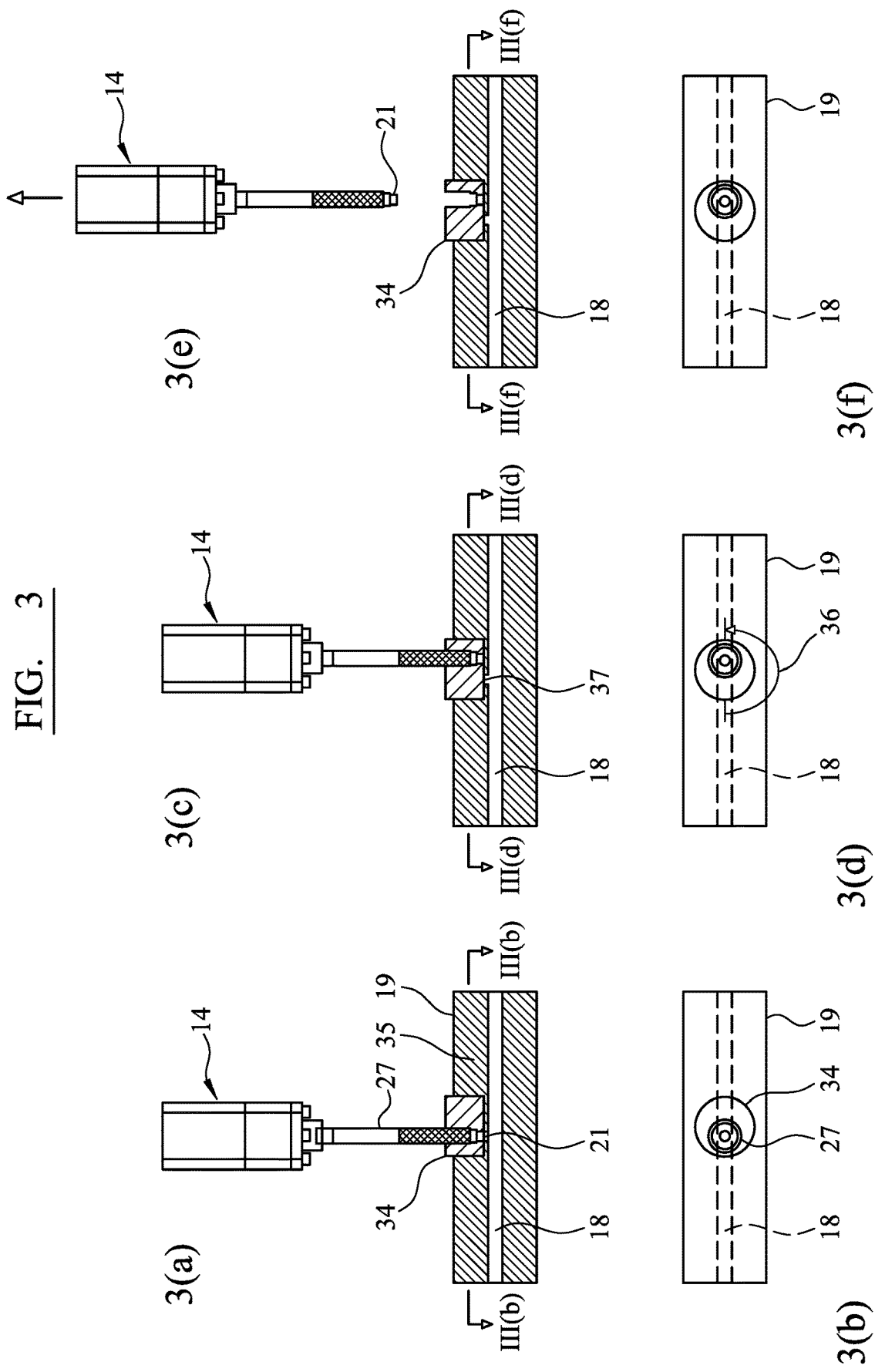
FIG. 3(a) is a schematic view of an injector/extruder assembly in side elevation, partly in cross-section, when in an operating configuration.
FIG. 3(b) is a cross-section along line III(b)-III(b) of FIG. 3(a) partly in cross-section.

FIGS. 3(c) and 3(d) are similar to FIGS. 3(a) ad 3(b) except the assembly is arranged in an intermediate configuration;

FIGS. 3(e) and 3(f) are similar to FIGS. 3(a) and 3(b) except the assembly is arranged in a disassembled configuration;

FIG. 4(a) is a schematic view of another injector/extruder assembly in side elevation, partly in cross-section, in an operating configuration;

FIG. 4(b) is a cross-section along line IV(b)-IV(b) of FIG. 4(a), partly in cross-section;

FIGS. 4(c) and 4(d) are similar to FIGS. 4(a) and 4(b) except the assembly is arranged in an intermediate configuration;

FIG. 5(a) is a schematic view of another injector/extruder assembly in side elevation, partly in cross-section, in an operating configuration;

FIG. 5(b) is a cross-section along line V(b)-V(b) of FIG. 5(a), partly in cross-section;

FIGS. 5(c) and 5(d) are similar to FIGS. 5(a) and 5(b), except the assembly is arranged in an intermediate configuration;

FIGS. 5(e) and 5(f) are similar to FIGS. 5(a) and 5(b), except the assembly is arranged in a disassembled configuration;

FIG. 6(a) is a schematic view of another assembly which includes an extruder and two injectors, in a first operating configuration;

FIG. 6(b) is a schematic view of the FIG. 6(a) assembly, in a second operating configuration;

FIG. 6(c) is a schematic view of the FIGS. 6(a) and 6(b) assemblies in a disassembled configuration;

FIG. 7(a) is a schematic view of another injector/extruder assembly in side elevation, partly in cross-section, in an operating configuration;

FIG. 7(b) is a cross-section along line VII(b)-VII(b) of FIG. 7(a), partly in cross-section;

FIGS. 7(c) and 7(d) are similar to FIGS. 7(a) and 7(b), except the assembly is arranged in an intermediate configuration;

FIGS. 7(e) and 7(f) are similar to FIGS. 7(a) and 7(b), except the assembly is arranged in a disassembled configuration;

FIG. 8(a) is a schematic representation of parts of a cylindrical spool in one configuration;

FIG. 8(b) is a schematic representation of the spool of FIG. 8(a) rotated through 90° relative to the FIG. 8(a) orientation;

FIG. 9(a) is a schematic view of another assembly which includes an extruder and two injectors, in a first operating configuration;

FIG. 9(b) is a schematic view of the FIG. 9(a) assembly, in a second operating configuration;

FIG. 9(c) is a schematic view of the FIGS. 9(a) and 9(b) assemblies in a disassembled configuration.

In the figures, the same or similar parts are annotated with the same reference numerals.

Figure 1:
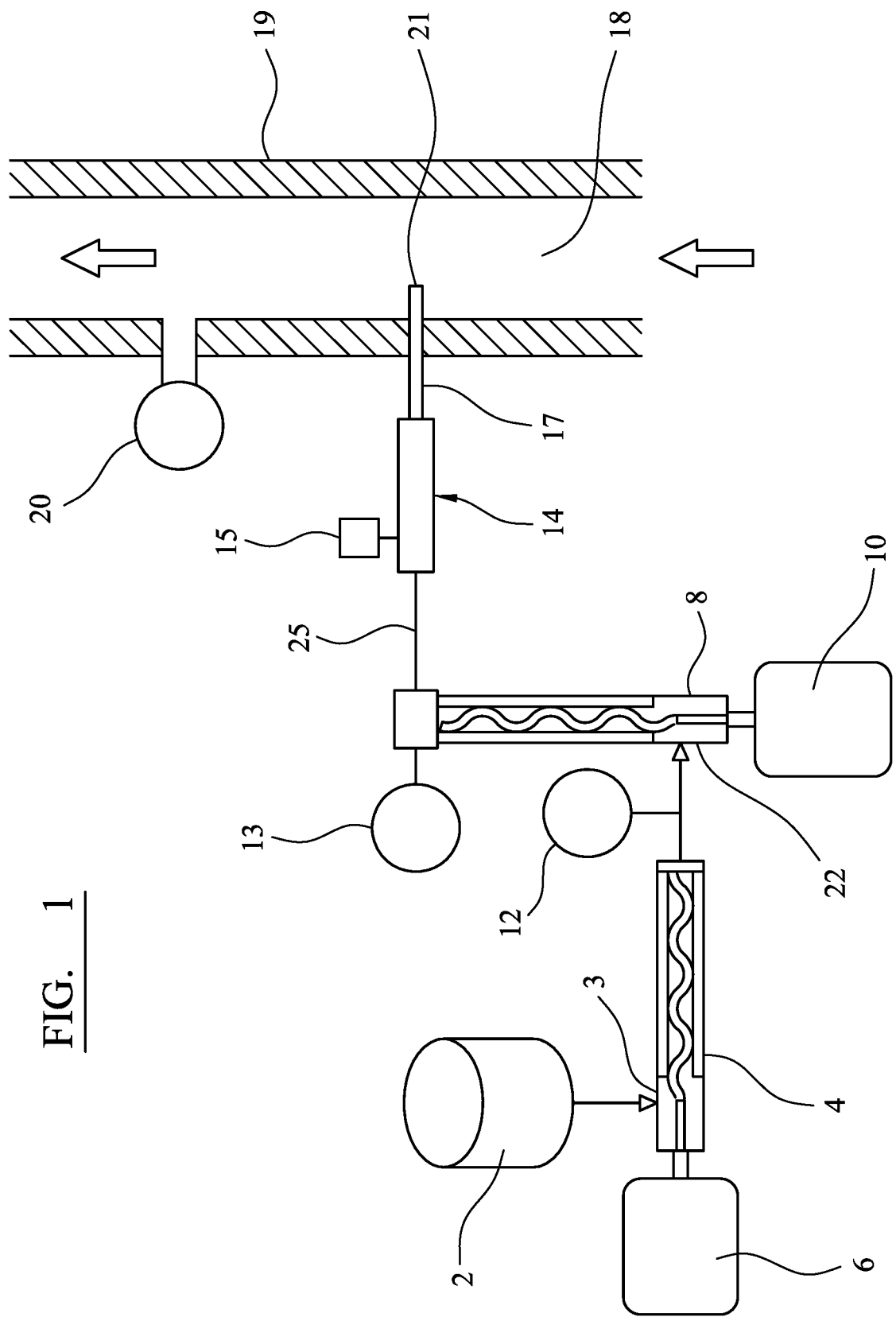
FIG. 1 is a schematic representation of apparatus for injecting a liquid formulation into molten polymer.

Injection apparatus for injecting a liquid formulation into a molten polymer, at high pressure, is shown in FIG. 1. The apparatus includes a reservoir 2 which contains the liquid formulation at ambient temperature and pressure and is arranged to flood feed pump body 3 of a first progressing cavity pump (pcp) 4. The first pcp 4 is driven by a motor 6 and is arranged to accurately meter the liquid formulation into a second pcp 8 which is downstream of the first pcp, is driven by a motor 10 and is arranged to increase the pressure of the liquid formulation up to 200 bar or more. A pressure transducer 12 is positioned in a flow line between the first and second pcps 4, 8.

Adjacent an outlet of the second pcp 8 is provided a second pressure transducer 13 which is arranged to monitor pressure of fluid exiting the second pcp 8.

Downstream of pump 8 is an injector 14, controlled by an actuator 15 and arranged to control passage of liquid formulation, via conduit 17 and outlet 21, into a pressurized molten polymer stream 18 which is present within an extruder 19 provided downstream of outlet 21. Conduit 17 is screw-threadedly engaged in the wall of the extruder. The extruder includes an associated pressure transducer 20 for monitoring the pressure of the polymer stream.

In use, the apparatus is controlled so the first pcp acts as a metering pump. It is driven to deliver a continuous stream of the liquid formulation accurately and in accordance with the real-time throughput of the polymer in the extruder 19, thereby to accurately delivery liquid formulation, including relevant additives, into the polymer, prior to the polymer being extruded into products such as sheet products, profile products and textile filaments.

Pressure within the pressurized molten polymer stream within the extruder will be significantly greater than the pressure which is deliverable by the first pcp 4. So, when the apparatus is initially operated, injector 14 is closed and therefore isolates the apparatus from the pressurized molten polymer stream. First pcp 4 is operated to meter liquid formulation against inlet 22 of the second pcp 8, with the pressure between first and second pumps 4, 8 being monitored by pressure transducer 12. The pressure is allowed to rise at pressure transducer 12 until a pre-set pressure is achieved. This pre-set pressure is relatively low and is selected to match the preferred discharge pressure capability of pump 4. It is typically 2-3 bar.

Once the pre-set pressure is reached, the second pcp 8 is driven by motor 10 to convey liquid formulation away from pressure transducer 12/inlet 22, while maintaining the pre-set pressure as measured by pressure transducer 12. The speed of motor 10 is continuously adjusted using a proportional-integral-derivative (P.I.D.) loop control to maintain the pre-set pressure at transducer 12 as accurately as possible, since it is found that maintaining a constant and actively controlled discharge pressure of the first pump 4 optimises the metering accuracy of the pump 4.

As pump 8 conveys liquid formulation away from pump 4, pressure is generated within the closed injector 14. The pressure is monitored by second pressure transducer 13. The injector 14 remains closed until the pressure at transducer 13 is equal to or slightly above the pressure of the molten polymer stream in the extruder 19. The pressure of the molten polymer may be assessed by a further pressure transducer 20. Alternatively, the pressure of the polymer may be known for a given set of polymer processing conditions and then programmed into the injection apparatus.

Once the pressure of the liquid formulation at transducer 13 reaches a suitable level (i.e. at or above the pressure of the molten polymer stream), actuator 15 is operated to open injector 14, thereby allowing liquid formulation to flow into the molten polymer stream. Consequently, the pressure of the liquid formulation at transducer 13 will immediately equalise with the pressure of the molten polymer stream in the extruder 19 at the position of injection. During this time, the rotational speed of pump 8 will be modulated as required to maintain the pre-set pressure at transducer 12.

By using P.I.D. loop control to maintain pressure at transducer 12, the injection apparatus may quickly automatically adjust to changes in the molten polymer stream in the extruder 19.

Figure 2:
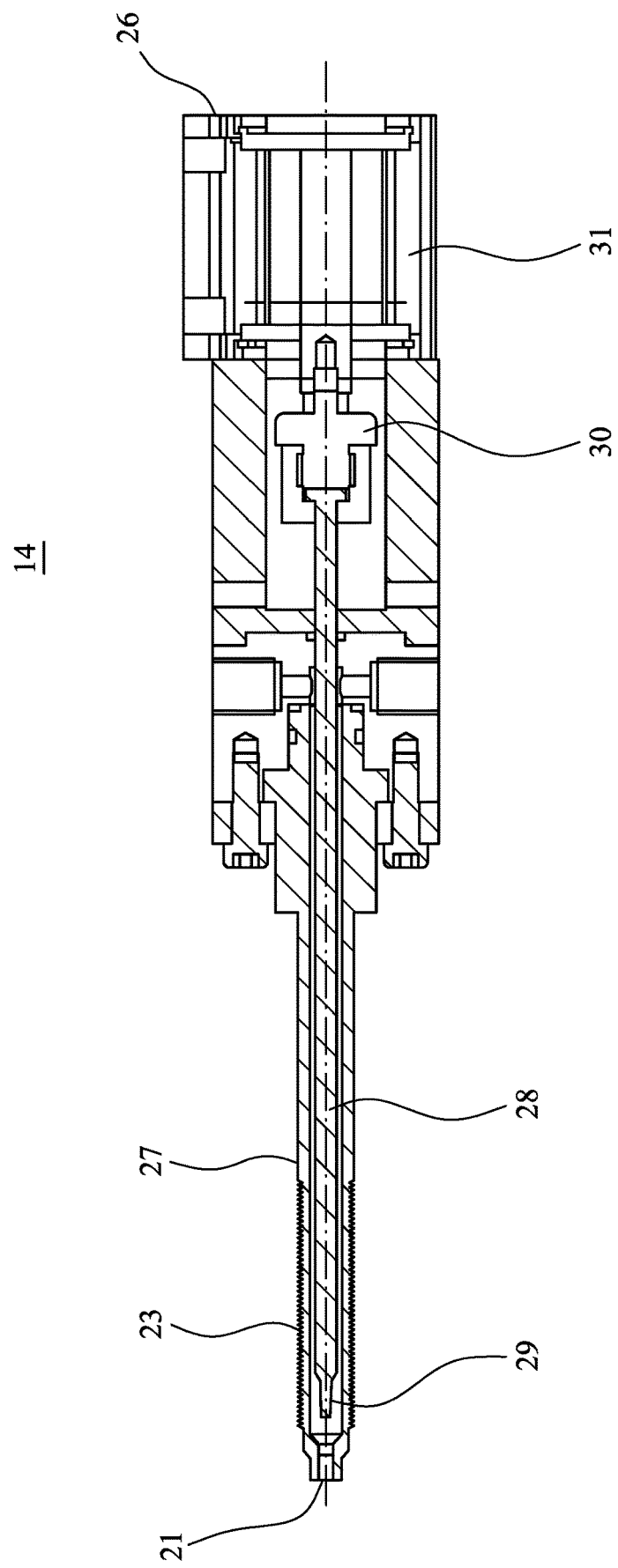
FIG. 2 is a cross-section through an injector.

Referring to FIG. 2, the injector 14 includes externally screw-threaded region 23 adjacent outlet 21 at one end and, at its other end, is arranged to be connected to upstream conduit 25 (FIG. 1) via a coupling housing 26 so that liquid formulation can pass from conduit 25 into the injector.

The injector includes an elongate conduit 27 in which an elongate pin 28 having a pointed end 29 is slideably arranged. The pointed end is arranged to extend within outlet 21 so it is capable of expelling all liquid formulation from conduit 27 and/or so there are no "dead spots" in which liquid formulation may be retained. The pin 28 is operatively connected to an adaptor 30 and pneumatic cylinder 31 which is operable to move pin 28 towards and away from outlet 21 to close/open the outlet and to control ejection of liquid formulation from the injector.

As described in the introduction of the present specification, there are risks the outlet 21 could become blocked in use, leading to restricted flow or cessation of flow of liquid from the injector 14. To address this problem, whilst avoiding the need to depressurize and/or stop the flow or polymer in the extruder 19 (which would lead to substantial "downtime" of the injection apparatus), the injection apparatus may be modified as described with reference to FIGS. 3 to 9.

Referring to FIGS. 3(a) and 3(b), a spool 34 is rotatably mounted within wall 35 of extruder 19 and is arranged to be rotated about an axis which extends substantially perpendicularly to the elongate extent of extruder 19 through which polymer stream 18 flows. The spool 34 is screw-threadedly engaged with conduit 27 of injector 14, such that the injector can inject liquid formulation via its outlet 21 into polymer 18 in the extruder. The configuration of FIGS. 3(a)/3(b) may be maintained with liquid formulation being injected into polymer stream 18 until there is a blockage (or partial blockage) in the injector 14 and/or it is otherwise desired to disengage the injector 14 from the injector/extruder assembly.

When it is desired to disengage the injector 14, the spool 34 (and associated injector 14) is caused to rotate through 180° as represented by arrow 36 in FIG. 3(d) into the intermediate configuration shown in FIG. 3(d). This can be done relatively rapidly and the pressure and flow of polymer stream 18 can be maintained throughout the movement. When in the FIG. 3(d) configuration, opening 37 in the wall 35 of the extruder 19 is closed by a surface of the spool.

Next, the injector 14 can be disengaged from the spool 34 to define the disassembled configuration of FIGS. 3(e) and 3(f). The injector 14 may then be cleaned and/or an alternative injector selected. The selected injector can subsequently be re-engaged with the spool 34 when in the FIGS. 3(e)/3(f) configuration to again define the FIGS. 3(c)/3(d) configuration. The spool 34 (and associated injector 14) can then be rotated back from the FIGS. 3(c)/3(d) configuration to the FIGS. 3(a)/3(b) configuration and the injector may then be operated to inject liquid formulation into the polymeric material. Advantageously, during movement from the FIGS. 3(a)/3(b) configuration to the FIGS. 3(e)/3(f) configuration and back, the polymer pressure and flow can be maintained. Consequently, any downstream apparatus (e.g. spinning machine and/or winding mechanisms) can be kept operating during the entire process, thereby minimising downtime and/or wasted production.

Figure 4:
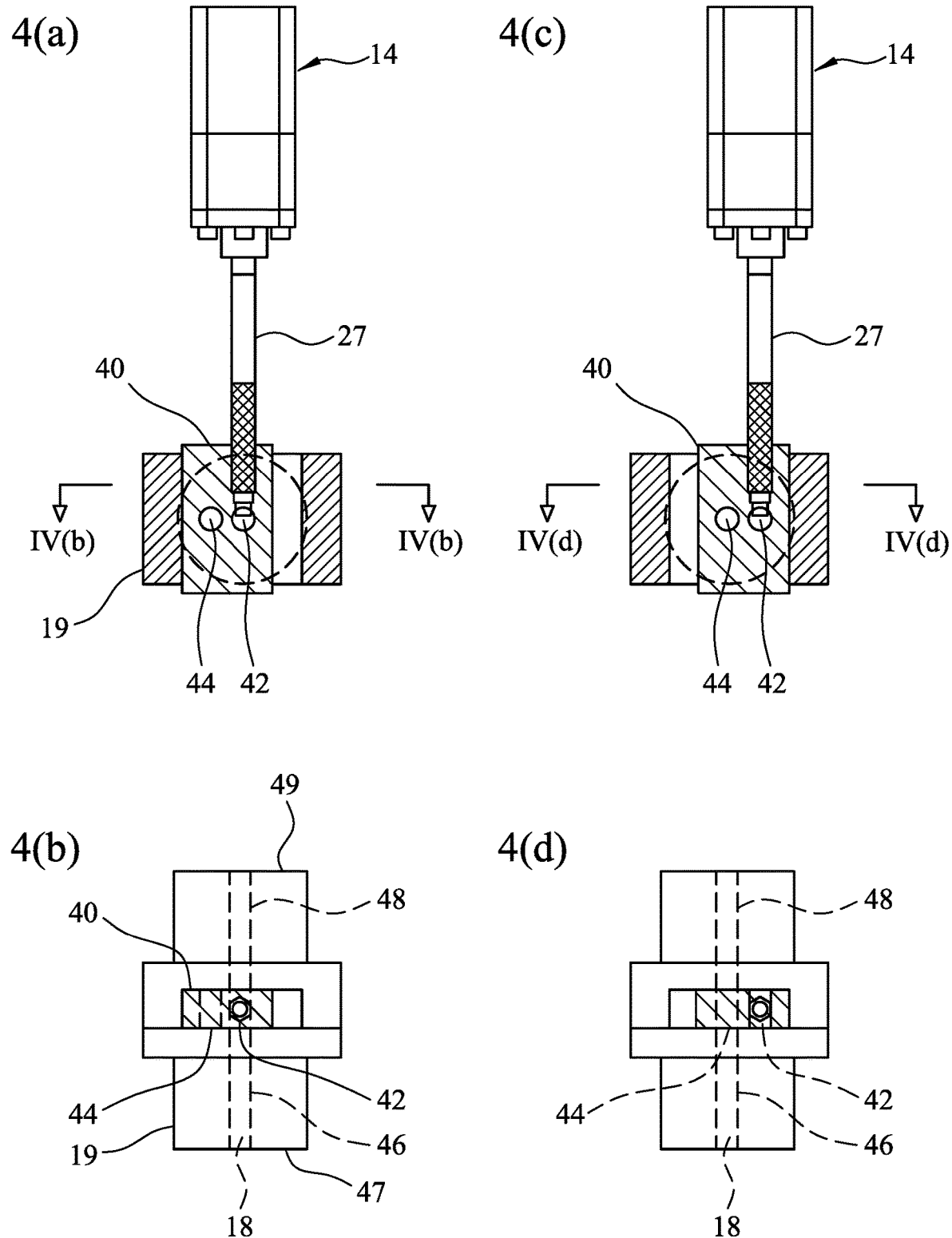

An alternative apparatus for addressing the problems described is shown in FIG. 4. In this case, the conduit 27 of injector 14 is screw-threadedly engaged in an opening in a slideable plate 40. The plate 40 incorporates two short channels 42, 44 which are arranged to be selectively inserted between respective flow channels 46, 48 through which polymer 18 flows. When a respective one of channels 42, 44 are aligned with flow channels 46, 48, an uninterrupted channel for flow of polymer 18 is defined from side 47 to side 49 (FIG. 4(b)) of the arrangement.

In FIG. 4(a), the channel 42 is shown to be aligned with flow channels 46, 48 so injector 14 is positioned to inject liquid formulation into polymer 18 in the extruder. This configuration may be maintained with liquid formulation being injected into polymer stream 18 until there is a blockage (or partial blockage) in the injector and/or it is otherwise desired to disengage the injector 14 from the injector/extruder assembly of FIG. 4.

When it is desired to disengage the injector 14, the plate 40 is slid from its position in FIGS. 4(a)/4(b) to its position shown in FIGS. 4(c)/4(d). When in the FIGS. 4(c)/4(d) configuration, the injector 14 is no longer aligned with flow channels 46, 48 and its outlet is effectively closed off, so liquid formulation can no longer flow from the injector. However, channel 44 defined in plate 40 is now aligned with flow channels 46, 48 so polymer 18 can still flow in channels 46, 48 via channel 44.

Thus, the pressure of polymer 18 in the extruder can be maintained as the injector is moved out of alignment with channels 46, 48 to the FIGS. 4(c)/4(d) configuration. When in the FIGS. 4(c)/4(d) configuration, the injector 14 can be disengaged from plate 40 and cleaned. The removed injector may subsequently be re-engaged with plate 40 (or an alternative injector may be engaged with the plate). In due course, the plate 40 may be slid back from the FIGS. 4(c)/4(d) configuration to the FIGS. 4(a)/4(b) configuration in which the injector can again inject liquid formulation into polymer 18.

Figure 5:
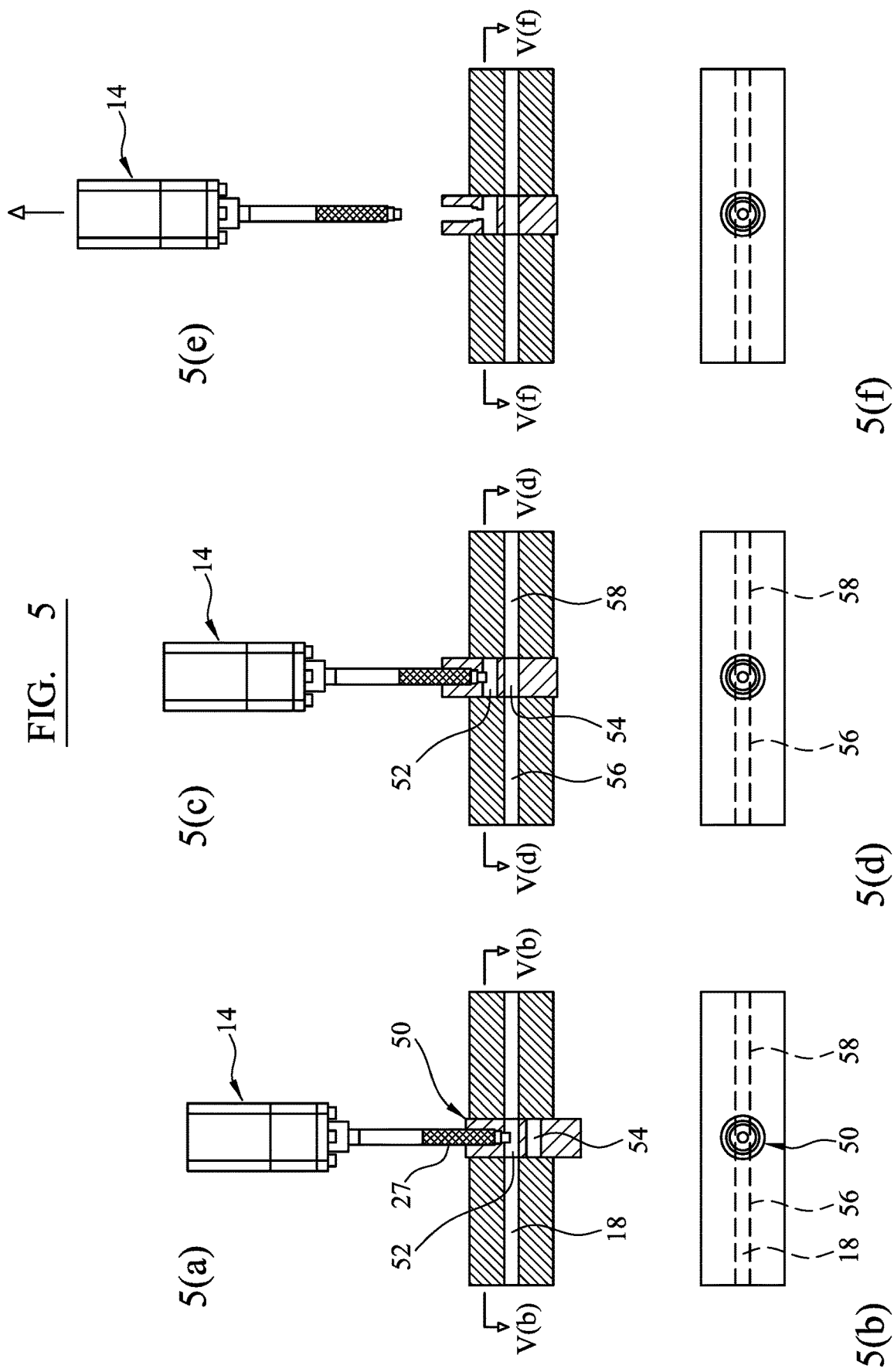

Another alternative apparatus for addressing the problems described is shown in FIG. 5. In this case, a cylindrical spool 50 incorporates two short channels 52, 54. Conduit 27 of injector 14 cooperates with and is arranged to inject liquid formulation into channel 52. The spool 50 is slideably engaged in a corresponding cylindrical channel and is arranged to index between the first configuration shown in FIGS. 5(a)/5(b) in which channel 52 is aligned with flow channels 56, 58 in which polymer 18 flows and a second configuration, shown in FIGS. 5(c)/5(d), in which channel 52 has been moved out of alignment with channels 56, 58 so that channel 54 is aligned with the channels 56, 58. When in the first configuration, injector 14 is positioned to inject liquid formulation into polymer 18 in the extruder. This configuration may be maintained with liquid formulation being injected until there is a blockage (or partial blockage) in the injector and/or it is otherwise desired to disengage the injector 14 from the injector/extruder assembly of FIG. 5.

When it is desired to disengage the injector 14, the spool is slid from the first configuration to the second configuration shown in FIGS. 5(c)/5(d). When in the FIGS. 5(c)/5(d) configuration, channel 52 into which injector 14 is arranged to inject liquid formulation is no longer aligned with flow channels 56, 58 so liquid formulation can no longer flow from the injector. However, channel 54 in the spool is aligned with flow channels 56, 58 so polymer 18 can still flow in channels 56, 58 via channel 44. Thus, the pressure of polymer 18 in the extruder can be maintained as the injector is moved out of alignment with channels 56, 58 to the FIGS. 5(c)/5(d) configuration. When in the FIGS. 5(c)/5(d) configuration, the injector 14 can be disengaged from spool 50 and cleaned and/or an alternative injector selected. The removed injector may subsequently be re-engaged with spool 50 (or an alternative injector may be engaged with the spool). In due course, the spool 40 may be slid back from the FIGS. 5(c)/5(d) configuration to the FIGS. 5(a)/5(b) configuration in which the injector can again inject liquid formulation into polymer 18.

Another alternative apparatus for addressing the problems described is shown in FIG. 6. In this case, the apparatus includes two injectors 14a, 14b which are movable from a first configuration in which injector 14a is arranged to inject liquid formulation into polymer 18 and injector 14b is not arranged to inject liquid formulation into polymer 18; to a second configuration in which injector 14b is arranged to inject liquid formulation into polymer 18 and injector 14a is not arranged to inject liquid formulation into the polymer.

The apparatus of FIG. 6 is similar to the apparatus of FIG. 5 and the same or similar parts are labelled with the same reference numerals. Thus, the FIG. 6 apparatus include a cylindrical spool 50 which incorporates two short channels 52, 54. Conduit 27a of injector 14a cooperates with and is arranged to inject liquid formulation into channel 52, when channel 52 is in a first configuration in which it is aligned with flow channels 56, 58 in which polymer 18 flows.

When it is desired to disengage the injector 14a, spool 50 is slid from the first operating configuration shown in FIG. 6(a) to the second operating configuration shown in FIG. 6(b). When in the second configuration, channel 52 into which injector 14a is arranged to inject liquid formulation is no longer aligned with flow channels 56, 58, but channel 54 into which injector 14b is arranged to inject liquid formulation is aligned with flow channels 56, 58. Thus, when in the second configuration, injector 27b can inject liquid formulation into polymer 18.

The apparatus can be operated between the FIGS. 6(a) and 6(b) configurations to provide a substantially continuous injection of liquid formulation into the polymer 18. In one embodiment, the liquid formulations injected by respective injectors 14a and 14b may be identical thereby allowing continuous injection of the same liquid formulation into the polymer. Even if injector 14a becomes blocked (or otherwise becomes inoperable), by sliding spool 50, injector 14b can immediately be arranged in the FIG. 6(b) configuration to continue injection of liquid formulation. In another embodiment, the liquid formulations injected by respective injectors 14a, 14b may be different (e.g. of different colours). In this case, the FIG. 6 apparatus can be used to rapidly change colour between the colour of the liquid formulation in injector 14a and that in injector 14b.

The pressure of polymer 18 in the extruder can be maintained as the apparatus is moved between the FIGS. 6(a) and 6(b) configurations. In addition, when in the FIG. 6(b) configuration, injector 27a may be disengaged by unscrewing it from spool 50, as illustrated in FIG. 6(c). Removed injector 14a may, after cleaning or repair, be re-engaged with spool 50, or injector 14a may be replaced with another injector if injector 14a is irreparable or otherwise cannot be used. Injector 14b may be removed when required in a similar manner.

Figure 7:
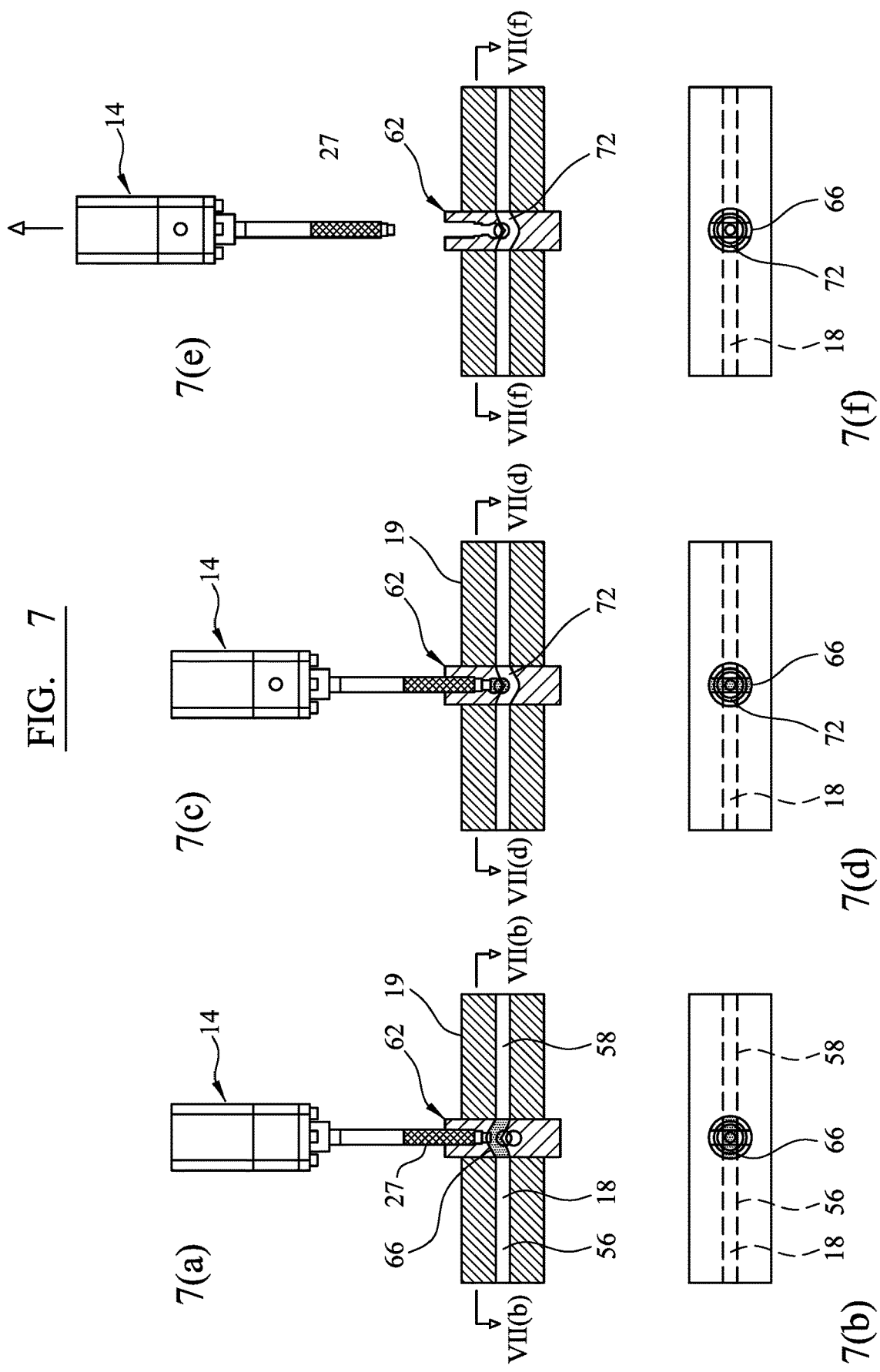

Another alternative apparatus is represented in FIGS. 7 and 8. In this case, a cylindrical spool 62 is rotatably arranged within the wall of extruder 19. The spool 62 includes two curved flow channels 66,72 which extend transversely through the spool 62. As represented in FIG. 8, a first flow channel 66 includes openings 68, 70 which are diametrically opposed and arranged to be aligned with flow channels 56, 58 (FIG. 7(a)) in the extruder so that polymer can flow, uninterrupted, through flow channels 56, 58 via channel 66. Channel 66 curves around a second flow channel 72 which includes openings 74, 76 which are also diametrically opposed. Openings 68, 70 face in directions which are offset 90° to the direction in which openings 74, 76 face. As represented in FIG. 8(b), channel 72 curves around channel 66 which includes opening 68. Channels 66, 72 are thus orientated at 90° to one another, do not intersect and define separate, distinct channels for carrying respective liquid formulations(s) which are isolated from one another.

Referring again to FIG. 7, conduit 27 of injector 14 cooperates with and is arranged to inject liquid formulation into channel 66, when channel 66 is in the first configuration of FIG. 7(a)/7(b) in which it is aligned with flow channels 56, 58 in which polymer 18 flows.

When it is desired to disengage injector 14, spool 62 is rotated through 90° to the second configuration of FIG. 7(c)/7(d). When in the second configuration, channel 66 into which injector 14 is arranged to inject liquid formulation is no longer aligned with flow channels 56, 58 but channel 72 is aligned with flow channels 56, 58, so polymer 18 can still flow in channels 56, 58 via channel 72. Thus, the pressure of polymer 18 in the extruder can be maintained as the injector is moved out of alignment with channels 56, 58 to the FIGS. 7(c)/7(d) configuration. When in the FIGS. 7(c)/7(d) configuration, the injector 14 can be disengaged from spool 62 (as represented in FIGS. 7(e)/7(f) and cleaned. The removed injector may subsequently be re-engaged with spool 62 (or an alternative injector may be engaged with the plate). In due course, the spool 62 may be slid back from the FIGS. 7(c)/7(d) configuration to the FIGS. 7(a)/7(b) configuration in which the injector can again inject liquid formulation into polymer 18.

Another alternative apparatus for addressing the problems described is shown in FIG. 9. In this case, the apparatus includes two injectors 14a, 14b which are movable from a first configuration (shown in FIG. 9(a)) in which injector 14a is arranged to inject liquid formulation into polymer 18 and injector 14b is not arranged to inject liquid formulation into polymer 18; to a second configuration (shown in FIG. 9(b)) in which injector 14b is arranged to inject liquid formulation into polymer 18 and injector 14a is not arranged to inject liquid formulation into the polymer.

The apparatus of FIG. 9 is similar to the apparatus of FIGS. 7 and 8 and the same or similar parts are labelled with the same reference numerals. Thus, the FIG. 9 apparatus include a cylindrical spool 62 which incorporates two curved flow channels 66, 72. Conduit 27a of injector 14a cooperates with and is arranged to inject liquid formulation into channel 66, when channel 66 is in a first configuration in which it is aligned with flow channels 56, 58 in which polymer 18 flows.

When it is desired to disengage the injector 14a, spool 62 is rotated from the first operating configuration shown in FIG. 9(a) to the second operating configuration shown in FIG. 9(b). When in the second configuration, channel 66 into which injector 14a is arranged to inject liquid formulation is no longer aligned with flow channels 56, 58, but channel 72 into which injector 14b is arranged to inject liquid formulation is aligned with flow channels 56, 58. Thus, when in the second configuration, injector 27b can inject liquid formulation into polymer 18.

The apparatus can be operated between the FIGS. 9(a) and 9(b) configurations to provide a substantially continuous injection of liquid formulation into the polymer 18. In one embodiment, the liquid formulations injected by respective injectors 14a and 14b may be identical thereby allowing continuous injection of the same liquid formulation into the polymer. Even if injector 14a becomes blocked (or otherwise becomes inoperable), by rotating spool 62, injector 14b can immediately be arranged in the FIG. 9(b) configuration to continue injection of liquid formulation. In another embodiment, the liquid formulations injected by respective injectors 14a, 14b may be different (e.g. of different colours). In this case, the FIG. 9 apparatus can be used to rapidly change colour between the colour of the liquid formulation in injector 14a and that in injector 14b.

The pressure of polymer 18 in the extruder can be maintained as the apparatus is moved between the FIGS. 9(a) and 9(b) configurations. In addition, when in the FIG. 9(b) configuration, injector 27a may be disengaged by unscrewing it from spool 62, as illustrated in FIG. 9(c). Removed injector 14a may, after cleaning or repair, be re-engaged with spool 62, or injector 14a may be replaced with another injector if injector 14a is irreparable or otherwise cannot be used. Injector 14b may be removed when required in a similar manner.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of injecting a liquid formulation into molten polymer using apparatus comprising a melt-processing device which includes a polymer flow conduit for passage of molten polymer and an injector (I) arranged to deliver liquid formulation via a first flow path into polymer within the melt-processing device, wherein said polymer flow conduit is part of an extruder, said method comprising:
   (i) selecting said apparatus comprising said polymer flow conduit for passage of molten polymer and said injector (I) arranged to deliver liquid formulation via a first flow path into polymer in said polymer flow conduit when the apparatus is in a first configuration;
   (ii) with the apparatus in said first configuration, operating said injector (I) to inject liquid formulation into molten polymer in said polymer flow conduit, via said first flow path;
   (iii) arranging the apparatus in a second configuration wherein said first flow path is interrupted and wherein molten polymer continues to flow in said polymer flow conduit;
   (iv) with said apparatus in said second configuration, disengaging said injector (I) from other parts of the apparatus and moving said injector (I) away from said polymer flow conduit, so there is no physical and/or operative connection between said injector (I) and said polymer flow conduit; and, during such movement, molten polymer continues to flow in said polymer flow conduit.

2. A method according to claim 1, wherein, in step (iii), said first flow path is closed and/or blocked off so that no liquid formulation is injected into said molten polymer in said polymer flow conduit.

3. A method according to claim 1, wherein, in step (iii), said first flow path is movable relative to said polymer flow conduit in order to define said second configuration and wherein, in step (iii), said first flow path and/or said injector (I) is/are movable to a position which defines said second configuration, wherein a fluid passage between said first flow path and said polymer flow conduit is blocked off, so liquid formulation cannot flow from said first flow path into said polymer flow conduit.

4. A method according to claim 1, wherein said first flow path comprises a conduit which is a component of said injector (I), wherein said conduit is substantially rigid and provides a substantially rigid connection between a body of said injector (I) and a wall which defines said polymer flow path.

5. A method according to claim 1, wherein the method includes a step (v) which follows step (iv) which comprises cleaning injector (I) after disengagement; the method includes a step (vi) which follows step (iv) and comprises engaging another injector, referred to as "the newly-engaged injector", with other parts of the apparatus, when said apparatus is in said second configuration; and the method includes a step (vii), after step (vi), which comprises, with said apparatus arranged in said second configuration, returning the apparatus to said first configuration, and using said newly-engaged injector to deliver liquid into polymer in said polymer flow conduit.

6. A method according to claim 5, wherein during the entire time from step (iii), through step (iv) wherein injector (I) is disengaged, during step (vi) wherein the newly-engaged injector is engaged with other parts of the apparatus and through step (vii) wherein the apparatus is returned to the first configuration, molten polymer flows continuously and/or uninterruptedly in said polymer flow conduit.

7. A method according to claim 1, wherein at some stage during movement between said first and second configurations, part of said first conduit and part of a second conduit are arranged at the same time to allow passage of polymer along said polymer flow conduit.

8. A method of injecting a liquid formulation into molten polymer using apparatus comprising a melt-processing device which includes a polymer flow conduit for passage of molten polymer and an injector (I) arranged to deliver liquid formulation via a first flow path into polymer within the melt-processing device, wherein said polymer flow conduit is part of an extruder, said method comprising:

(i) selecting said apparatus comprising said polymer flow conduit for passage of molten polymer and said injector (I) arranged to deliver liquid formulation via a first flow path into polymer in said polymer flow conduit when the apparatus is in a first configuration;

(ii) with the apparatus in said first configuration, operating said injector (I) to inject liquid formulation into molten polymer in said polymer flow conduit, via said first flow path;

(iii) arranging the apparatus in a second configuration wherein said first flow path is interrupted and wherein molten polymer continues to flow in said polymer flow conduit;

(iv) with said apparatus in said second configuration, disengaging said injector (I) from other parts of the apparatus and moving said injector (I) away from said polymer flow conduit, so there is no physical and/or operative connection between said injector (I) and said polymer flow conduit;

wherein said polymer flow conduit of said apparatus includes a fixed conduit (I) for passage of liquid formulation and a moveable section, wherein said moveable section includes a first conduit for liquid formulation and a second conduit for liquid formulation, wherein said method comprises moving said moveable section relative to the fixed conduit (I) on moving said apparatus from said first configuration to said second configuration.

9. A method according to claim 8, wherein during the entirely of the movement from said first to said second configuration, at least one of said first conduit or said second conduit is positioned to allow passage of polymer along said polymer flow conduit.

10. A method according to claim 1, wherein said apparatus includes said injector (I) and an injector (II) and the method comprises, in step (iii), arranging said apparatus in said second configuration wherein said first flow path is interrupted and wherein molten polymer continues to flow in said polymer flow conduit and positioning said injector (II) adjacent said polymer flow conduit so it can deliver liquid formulation into polymer in said polymer flow conduit.

11. A method according to claim 1, wherein said molten polymer is spun to produce fibres.

12. A method according to claim 1, wherein said liquid formulation delivered in the method has a viscosity of at least 5000 cP and less than 250,000 cP; and/or comprises a vehicle and one or more additives; and/or said liquid formulation includes at least 20 wt % of colourant; and/or said liquid formulation includes 15 to 80 wt % of vehicle and 20 to 85 wt % of additives.

13. A method according to claim 1, wherein said method comprises sensing whether said injector (I) is blocked or partially blocked.

14. A method according to claim 1,
wherein said apparatus includes a driver or actuator for reconfigurating the apparatus between a first configuration in which said injector (I) is arranged to deliver liquid formulation via said first flow path into polymer within the polymer flow conduit and a second configuration in which said first flow path is restricted;
wherein said apparatus comprises a first pump upstream of said injector (I) and being arranged to pump liquid formulation to said injector (I) and a second pump upstream of said injector (I), wherein said first pump and said second pump are arranged in series in said fluid path and said first pump is upstream of said second pump;

wherein said first pump is arranged to feed liquid formulation into an inlet of the second pump at a pressure which is greater than 100 KPa and is less than 1000 KPa; and said second pump is arranged to increase pressure by at least 10000 KPa;

wherein said first pump is provided upstream of the second pump and a reservoir is upstream of the first pump with the reservoir being connected to the first pump via a conduit (B).

15. A method according to claim 1, wherein:
in step (iii), said first flow path is closed and/or blocked off, suitably so that no liquid formulation is injected into said molten polymer in said polymer flow conduit;
in step (iii), said first flow path is movable relative to said polymer flow conduit in order to define said second configuration;
in step (iv), said injector (I) is moved away from said polymer flow conduit and, during such movement, molten polymer continues to flow in said polymer flow conduit;
at some stage during movement between said first and second configurations, part of said first conduit and part of said second conduit are arranged at the same time to allow passage of polymer along said polymer flow conduit;
said polymer flow conduit is part of an extruder arranged to extrude the molten polymer;
said molten polymer is spun to produce fibres.

16. A method according to according to claim 8, wherein said movable section is arranged to be rotated about a fixed axis which extends transversely to the direction of flow of polymer through said fixed conduit (I), wherein said movable section is cylindrical and includes two curved flow channels, referred to as channels (A) and (B), which define said first conduit for liquid formulation and second conduit for liquid formulation, wherein said channel (A) includes diametrically opposed openings which are arranged to be aligned with said fixed conduit (I) and fixed conduit (II), wherein said channel (B) also includes diametrically opposed openings which are arranged to be aligned with said fixed conduit (I) and fixed conduit (II).

17. A method according to according to claim 16, wherein openings in channel (A) face in directions which are offset relative to the openings in channel (B), wherein said channel (B) curves around channel (A); and
wherein the movable section is rotatable between a position wherein channel (A) is aligned with fixed conduit (A) and channel (B) is aligned with fixed conduit (A).

18. Apparatus for use in the method of claim 1, the apparatus comprising:
(i) a melt-processing device which includes a polymer flow conduit for passage of molten polymer, wherein said polymer flow conduit is part of an extruder;
(ii) an injector (I) arranged to deliver liquid formulation via a first flow path into polymer within the melt-processinq device;
(iii) means for reconfiguring the apparatus between a first configuration in which said injector (I) is arranged to deliver liquid formulation via said first flow path into polymer within the polymer flow conduit and a second configuration in which said first flow path is restricted;
wherein said apparatus is arranged so that said injector (I) can be disengaged from other parts of the apparatus and moved away from said polymer flow conduit so there is no physical and/or operative connection between said injector (I) and said polymer flow conduit and said apparatus is arranged such that, during such movement, molten polymer can continue to flow in said polymer flow conduit; wherein said polymer flow conduit comprises a fixed conduit (I), a movable section which includes a first conduit and a second conduit and a fixed conduit (II), wherein one of said fixed conduits (I) or (II) is upstream of the movable section and the other one of said fixed conduits (I) or (II) is downstream of said movable section, wherein the apparatus is arranged such that, on moving from said first configuration to said second configuration, said movable section is moved between said first configuration wherein said polymer flow conduit comprises said fixed conduit (I), said first conduit of said movable section and said fixed conduit (II) to said second configuration wherein said polymer flow conduit comprises said fixed conduit (I), said second conduit of said movable section and said fixed conduit (II);

wherein said movable section is arranged to be rotated about a fixed axis which extends transversely to the direction of flow of polymer through said fixed conduit (I), wherein said movable section is cylindrical and includes two curved flow channels, hereinafter referred to as channels (A) and (B), which define said first conduit for liquid formulation and second conduit for liquid formulation, wherein said channel (A) includes diametrically opposed openings which are arranged to be aligned with said fixed conduit (I) and fixed conduit (II), wherein said channel (B) also includes diametrically opposed openings which are arranged to be aligned with said fixed conduit (I) and fixed conduit (II);

wherein said channel (B) curves around channel (A);

wherein the movable section is rotatable between a position wherein channel (A) is aligned with fixed conduit (A) and channel (B) is aligned with fixed conduit (A).

\* \* \* \* \*